Figure 1:
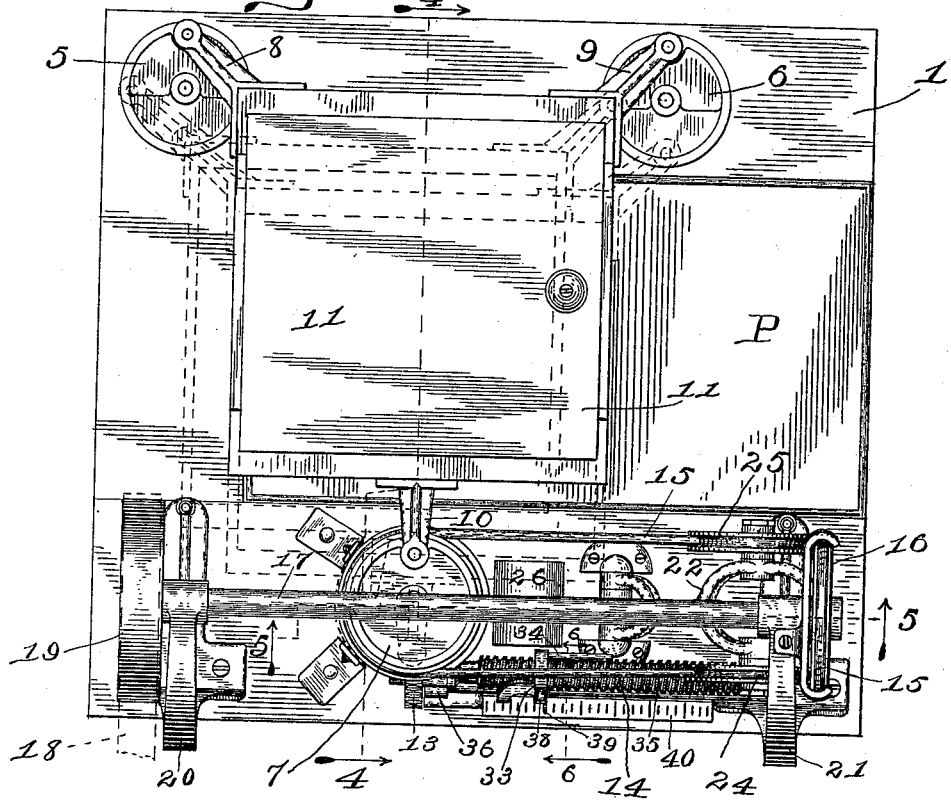

No. 639,834.  
J. WARRINGTON.  
MACHINE FOR TESTING MILL PRODUCTS.  
(Application filed Aug. 7, 1899.)  
(No Model.)  
Patented Dec. 26, 1899.  
3 Sheets—Sheet 1.

WITNESSES:  
C. S. Frye  
J. A. Walsh

INVENTOR  
Jesse Warrington,  
BY Chester Bradford,  
ATTORNEY.

No. 639,834. Patented Dec. 26, 1899.
J. WARRINGTON.
MACHINE FOR TESTING MILL PRODUCTS.
(Application filed Aug. 7, 1899.)

(No Model.) 3 Sheets—Sheet 2.

WITNESSES:
C. S. Frye
J. A. Walsh

INVENTOR
Jesse Warrington,
BY Chester Bradford,
ATTORNEY.

No. 639,834. Patented Dec. 26, 1899.
J. WARRINGTON.
MACHINE FOR TESTING MILL PRODUCTS.
(Application filed Aug. 7, 1899.)
(No Model.) 3 Sheets—Sheet 3.
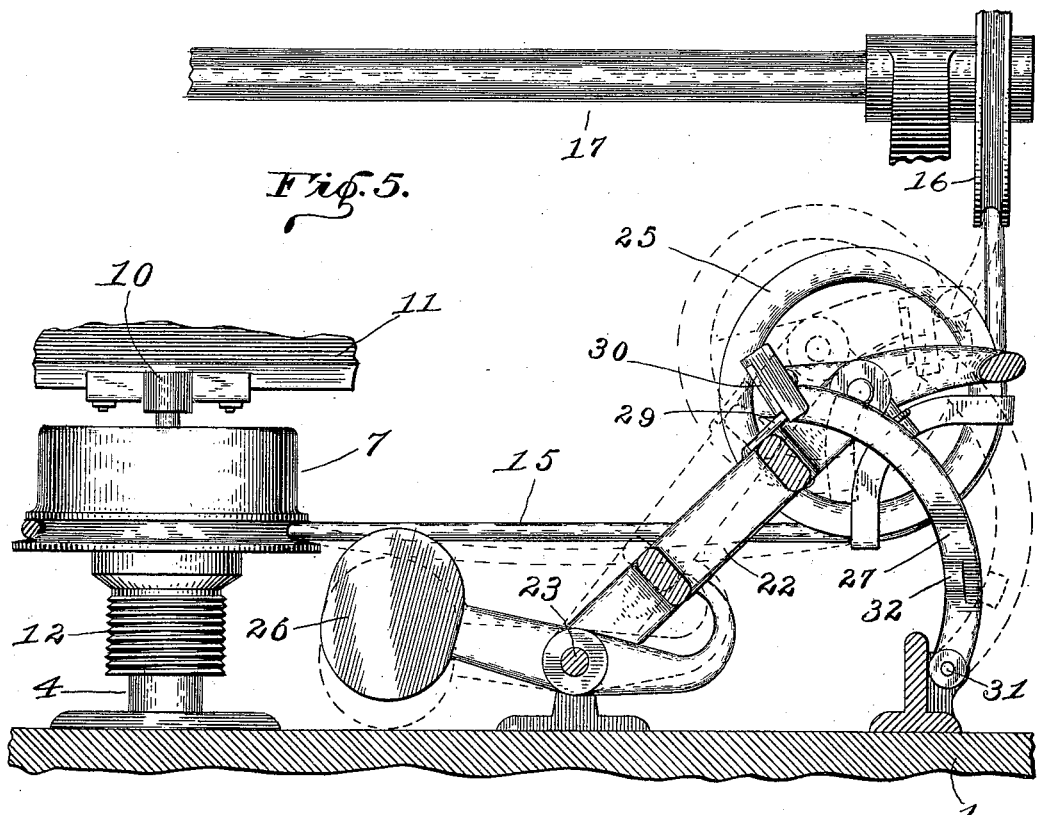
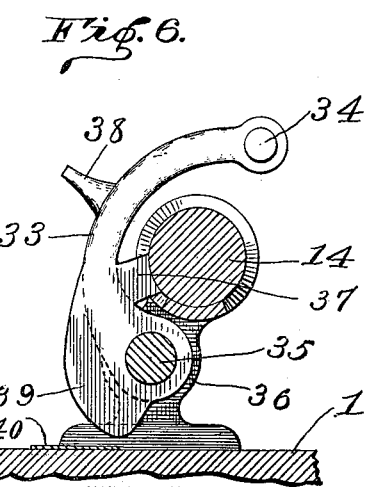
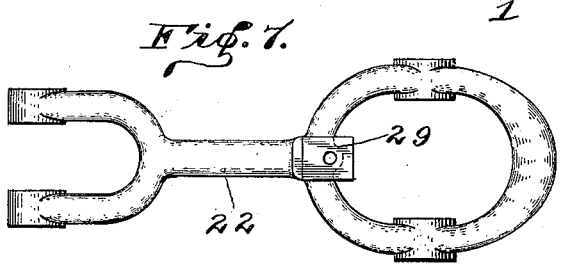
WITNESSES:
C. S. Frye
J. A. Walsh
INVENTOR
Jesse Warrington,
BY
Chester Bradford,
ATTORNEY.

UNITED STATES PATENT OFFICE.

JESSE WARRINGTON, OF INDIANAPOLIS, INDIANA, ASSIGNOR OF ONE-HALF TO THE NORDYKE & MARMON COMPANY, OF SAME PLACE.

MACHINE FOR TESTING MILL PRODUCTS.

SPECIFICATION forming part of Letters Patent No. 639,834, dated December 26, 1899.

Application filed August 7, 1899. Serial No. 726,441. (No model.)

*To all whom it may concern:*

Be it known that I, JESSE WARRINGTON, a citizen of the United States, residing at Indianapolis, in the county of Marion and State of Indiana, have invented certain new and useful Improvements in Machines for Testing Mill Products, of which the following is a specification.

The object of this invention is to provide a machine which may be used in flouring-mills for testing the bolting or separations of different stocks, materials, or products throughout a milling system; and it is designed to supersede ordinary hand-sieves, which have generally been used for this purpose. The accuracy of a test of this character obviously largely depends upon the regularity of motion of the testing-sieve and upon the uniformity in the periods of time consumed in treating the various samples to be compared, and the difficulty of equally treating different samples, both in respect to regularity of motion and in respect to the length of time, by means of a hand testing apparatus has rendered such tests unsatisfactory and inaccurate, while at best the use of such apparatus involves a tedious and laborious operation. By my machine much greater accuracy is attained with practically no labor.

My invention is useful in determining whether or not better results may be obtained in any given milling system by experimenting with the different stocks on different numbers or grades of bolting-cloth. It also may be used to determine the relative capacity of machines of different types of construction treating the same kind of stock. It may also be used for testing or examining the condition of tailings from reels or sieves. In each and all of its operations the length of time for each treatment may be predetermined by regulating the position of an adjustable trip, by which the machine may be caused to automatically stop at the end of any period of time, and uniformity of time on each test may be secured by setting the traveler carrying this trip at the same point at the beginning of each test.

In a machine embodying my invention, which will hereinafter be described in detail, I have provided a range of adjustment sufficient so that any desired period within the limits of from about twelve seconds to about seven minutes may be employed in making such test. Of course this period can be further varied, if desired, by increasing the length of the trip-propelling means or varying the speed. Such machine will now be fully described and the novel features thereof then pointed out in the claims.

Figure 2:
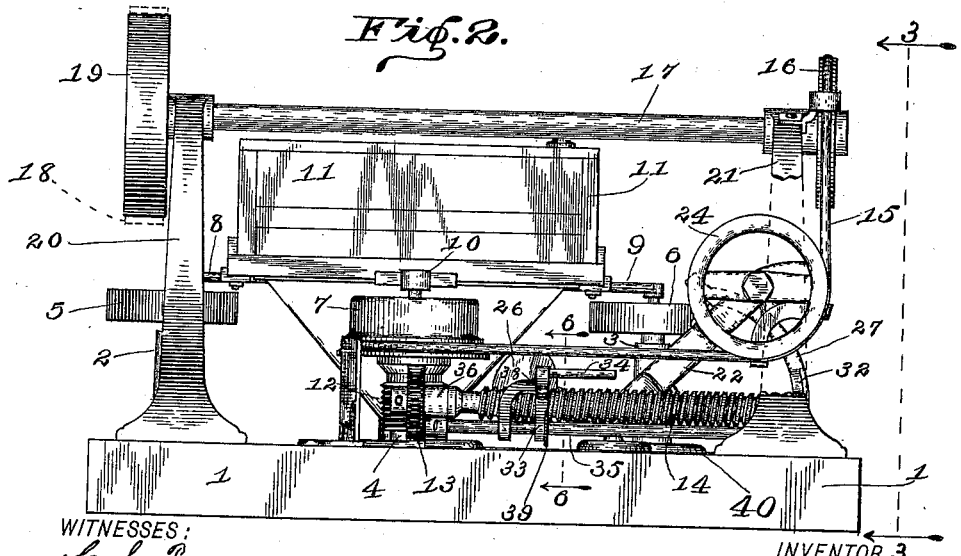
Figure 3:
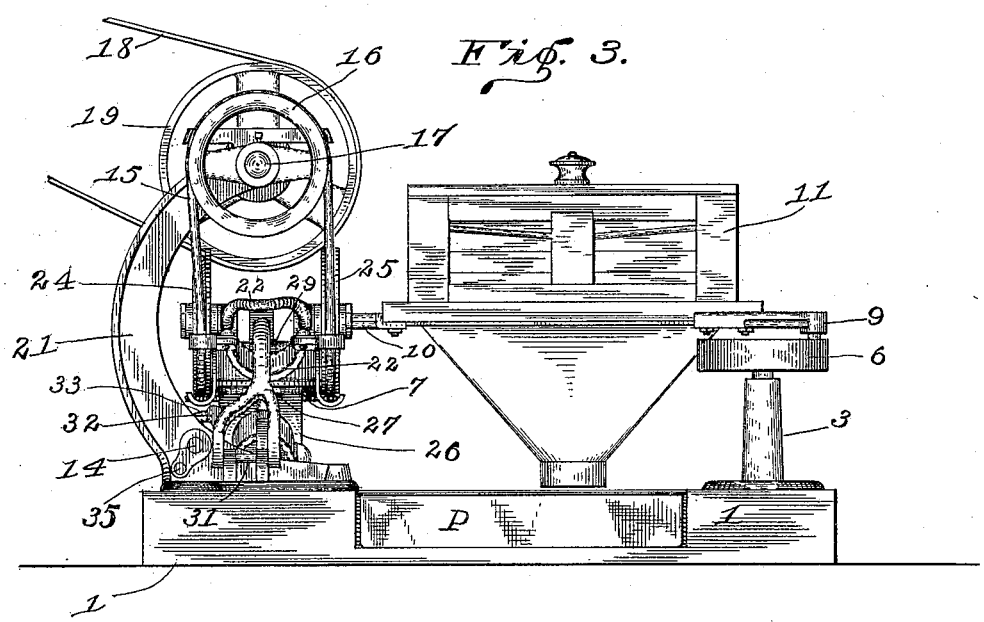
Figure 4:
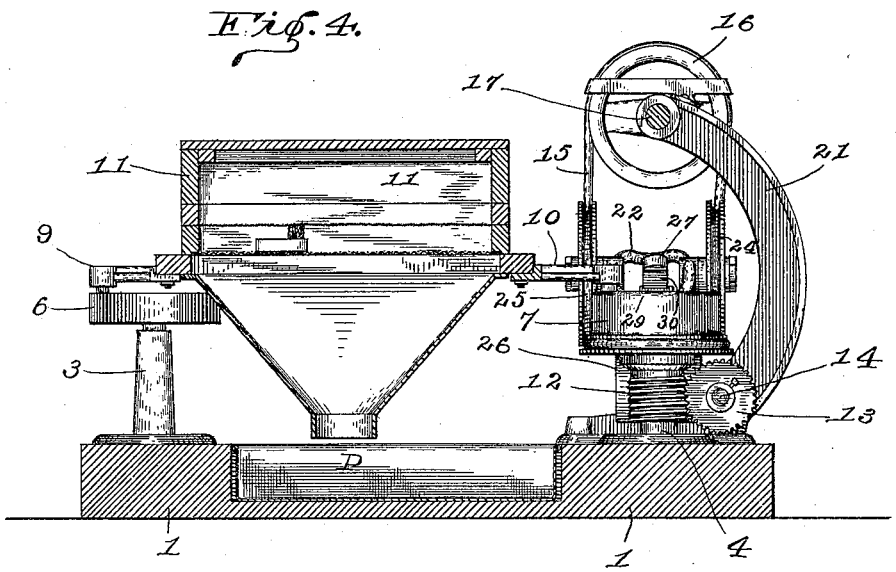

Referring to the accompanying drawings, which are made a part hereof and on which similar reference characters indicate similar parts, Figure 1 is a top or plan view of a machine embodying my said invention; Fig. 2, a side elevation of the same; Fig. 3, an end elevation as seen from the dotted line 3 3 alongside Fig. 2; Fig. 4, a transverse vertical sectional view as seen from the dotted line 4 4 in Fig. 1; Fig. 5, a detail sectional view, on an enlarged scale, as seen from the dotted line 5 5 in Fig. 1; Fig. 6, a detail sectional view as seen from the dotted line 6 6 in Figs. 1 and 2, and Fig. 7 a detail plan view of one of the parts hereinafter to be described.

The machine, as shown in said drawings, is composed of a suitable base 1, upon which are rigidly mounted three pillars 2, 3, and 4, carrying crank-wheels 5, 6, and 7, which support, by means of arms 8, 9, and 10, a sieve structure 11, which, when motion is imparted thereto through said crank-wheels is given a shaking or gyratory motion, by which a sifting operation is accomplished, as will be hereinafter described. The crank-wheel 7 has a threaded shank 12, which sleeves down onto the pillar 4 and forms a worm which engages with a screw-gear 13, secured upon and adapted to drive a coarsely-threaded screw 14, which screw is mounted at or near its ends in suitable bearings and which serves to propel an automatically-operating trip, as will be presently described.

The sieve structure 11 is driven from the wheel 7, which in turn is driven by the belt 15 running over the sheaves of a tightener to a driving pulley or sheave 16 on the main driving-shaft 17, which latter is driven from any suitable source of power, preferably by a belt 18 running to a pulley 19 on said shaft. Said shaft is mounted in bearings in the upper ends of standards 20 and 21, and the lower end of the standard 21 also includes bearings for other parts of the mechanism, as will be presently described.

The tightener is composed of a frame 22, which is mounted on a pivot 23, and two sheaves 24 and 25, mounted upon suitable stud-shafts extending out from the sides of the frame 22. This tightener is provided with a counterpoise 26, which may be either formed separately and also mounted on the pivot 23 or formed integrally with the tightener-frame 22, as may be desired, and which when the tightener is released from the latch 27 will throw said tightener up to the position indicated by the dotted lines in Fig. 5, and thus the belt 15 will be loosened sufficiently, so that it will not drive the crank-wheel 7. When this occurs, the sieve structure and the indicating and tripping mechanism will automatically stop, notwithstanding the continued motion of the shaft 17. A suitable catch-plate 29 is shown as secured to the tightener-frame 22, and a similar latch-plate 30 is shown as secured to the latch 27, and these parts 29 and 30 are preferably formed from steel and made adjustable in order that durability and accuracy may be insured.

The latch 27 is mounted on a pivot 31 and is capable of a movement indicated by the full and dotted lines in Fig. 5. At its extreme movement, as indicated by the dotted lines, it comes in contact with the loop portion of the tightener-frame 22, and further movement thereof is prevented. A projection 32 is formed at the proper point on this latch 27, and a traveler 33, driven by the screw 14, is adapted to strike said projection, and thus force the latch back, disengaging the latch from the tightener-frame and permitting the counterpoise 26 to loosen the tightener, as above described. For convenience of construction and operation I have provided the traveler 33 with an arm 34, which immediately strikes the contact-point 32 on the latch 27. The traveler 33 is mounted upon and guided by the rod or track 35, which, like the screw 14, is mounted at one end in the base of the standard 21 and at the other end in a small independent standard or bearing-piece 36. Said traveler is so mounted on its track-rod 35 that it may swing toward and from the screw 14. On its side nearest said screw 14 it has a projection 37, which passes between and engages with the threads of said screw, by which it is driven when in engagement. It is also provided with a handle-piece 38 for convenience in manipulation. Extending downwardly and outwardly from said traveler, on the opposite side thereof from that which bears the engaging projection 37, is a pointer 39, which is of service in connection with the indicator-gage, which will shortly be described, in exactly determining the position of the traveler. This pointer is preferably in the form of a segment of a circle, the peripheral edge of which should be nearly or quite sharp, but sufficiently extended, so that it will maintain a close relation to the indicator-gage whatever its position. Upon the frame 1, adjacent to said traveler, is the scale or gage 40, which has indicator-marks thereon indicating the distance through which the traveler must move from any given point before it will operate to trip or unlatch the latch 27. As will be observed, the pointer 39 is in close proximity to this scale or gage. By this means I am enabled to time the operation of the machine, thus causing it to operate through any predetermined period within the limit of the movement of the apparatus.

In the arrangement shown, with the shaft 17 running at a speed of two hundred revolutions per minute, (which is a suitable speed for it,) the machine is capable of running seven minutes when the whole length of the screw 14 is utilized, and by setting the traveler at the proper intermediate point between the ends of the screw any desired time less than the whole time just named may be predetermined.

In using this machine a suitable quantity (ordinarily from half a pound to a pound) of the mill product is placed within the sieve structure and the cover placed thereon. The traveler is then moved to a point indicating the time it is desired the test shall continue—say seven minutes—and the machine put in motion. During this time of course a certain proportion of the material placed in the sieve structure will be sifted and discharged into a suitable receptacle, as the pan P, underneath. Then another sample, which it is desired to compare with the first, is placed in the machine and the operation repeated. As many of these operations are performed as may be necessary to secure the information required, and at the end of such tests the products are carefully weighed and compared, and from the data thus obtained the degree of perfection of operation of the mill or mills from which the stock has been taken is ascertained and determined.

Having thus fully described my said invention, what I claim as new, and desire to secure by Letters Patent, is—

1. The combination, in a machine for testing mill products, of a sifter, means for imparting motion to said sifter, a timing mechanism connected with the motion-imparting means, and a traveler adapted to engage with said timing mechanism whereby the motion-imparting means may be automatically released or disconnected at the end of a predetermined period and the operation of the sifter thus stopped.

2. The combination, in a machine for testing mill products, of a framework embodying upright pillars, crank-wheels mounted on said pillars, a sifter mounted on said crank-wheels and adapted to have a horizontal gyratory motion, a driving-shaft, a belt running from said driving-shaft over a tightener to one of said crank-wheels, said tightener, a counterpoise for said tightener, a latch whereby said tightener is held against said belt, a screw, a worm-gear connected with said crank-wheel for driving said screw, and a traveler adapted to engage with and be operated by said screw and provided with a suitable engaging point adapted to strike and disengage said latch and release the tightener.

3. The combination, in a machine for testing mill products, of a suitable frame, a sifter horizontally mounted on crank-wheels carried on bearings supported by said frame, said crank-wheels one of which is provided with a belt-surface, a driving-shaft mounted in suitable relation to said sifter, a belt running from a pulley on said driving-shaft to the crank-wheel having a belt-surface, a tightener arranged intermediate said pulley and said crank-wheel including two loosely-mounted sheaves or pulleys over which said belt runs, a screw-threaded sleeve on said crank-wheel serving as a worm, a screw having a screw gear-wheel engaging with said worm, an indicator-gage fastened to the frame alongside said screw, a track-rod running parallel with said screw, and a traveler mounted on said track-rod and adapted to engage with said screw and having an indicator-point extending out adjacent to said indicator-gage and provided with a contact-point whereby the latch may be disengaged and the tightener released, substantially as set forth.

In witness whereof I have hereunto set my hand and seal, at Indianapolis, Indiana, this 3d day of August, A. D. 1899.

JESSE WARRINGTON. [L. S.]

Witnesses:
W. A. COFFMAN,
JAMES A. WALSH.